United States Patent [19]
Drexhage

[11] 3,712,059
[45] Jan. 23, 1973

[54] REVERSE FLOW INTERNALLY-COOLED ROCKET ENGINE

[75] Inventor: Martin G. Drexhage, Eggertsville, N.Y.

[73] Assignee: Textron Inc., Providence, R.I.

[22] Filed: Dec. 3, 1970

[21] Appl. No.: 94,895

[52] U.S. Cl. ..................60/258, 60/211, 60/265
[51] Int. Cl..............................................F02k 9/02
[58] Field of Search.......60/258, 265, DIG. 8, 211, 39.74 R

[56] References Cited

UNITED STATES PATENTS

| | | | |
|---|---|---|---|
| 2,591,421 | 4/1952 | Goddard | 60/DIG. 8 |
| 3,451,223 | 6/1969 | Main | 60/258 |
| 3,286,997 | 11/1966 | Ledbetter | 60/258 |
| 3,462,956 | 8/1969 | Kayser | 60/265 |
| 2,760,335 | 8/1956 | Goddard | 60/DIG. 8 |
| 2,667,740 | 2/1954 | Goddard | 60/258 |
| 3,546,883 | 12/1970 | Munding | 60/258 |
| 2,453,378 | 11/1948 | Lubbock | 60/258 |
| 3,190,070 | 6/1965 | Neu | 60/258 |

*Primary Examiner*—Douglas Hart
*Attorney*—Bean and Bean

[57] ABSTRACT

An improved liquid or gas combusting type rocket engine operable to develop large gas volumes upon reactive engagement of fluids of the so-called fuel and oxidizer types: said engine including in combination, a combustion chamber section having a gas film-cooled inner wall surface configuration of continuous positive curvature and a nozzle section having internally cooled convergent, throat, and divergent exit wall portions. One of the reactant fluids is fed into the inlet end of the combustion chamber section in two separate fractions; one fraction being introduced through a swirl or vortex generating injection system, and the other fraction being straight-line injected through the center of the vortex and along the center lines of the combustion chamber and thrust exit nozzle portions. The other reactant fluid is introduced through a manifold which encircles the exit end of the nozzle and delivers into passageways formed internally of the nozzle wall structure and extending lengthwise thereof, which in turn deliver the fluid into the combustion chamber in such fashion as to flow in the form of a film closely adhering to the wall thereof while travelling from the outlet end toward the inlet end thereof. The inlet end of the combustion chamber is torus shaped, whereby a central opening is provided for passage therethrough of the combination swirl and straight-line charge of the first mentioned reactant fluid. This chamber shape ensures that the film of the second mentioned fluid continues to flow tightly against the entire length of the combustion chamber until it is cascaded back into the chamber and into intimate admixture with the first mentioned fluid as it exits from its injection system. Thus, the second mentioned fluid operates as a highly efficient coolant for both the nozzle and combustion chamber sections, and then enters into reaction with the first fluid in such a manner as to provide for a greatly improved reaction efficiency. Typically, the fluid operating as the coolant will be a fuel such as hydrogen; and the fluid entering the combustion chamber through the whirl injector system will be an oxidizer, such as oxygen. The invention is particularly suited for installation and operation within an environment of closely adjacent hardware (structural or mechanical, or electrical components, etc.) such as cannot tolerate heating.

8 Claims, 3 Drawing Figures

United States Patent
Drexhage
[11] 3,712,059
[45] Jan. 23, 1973
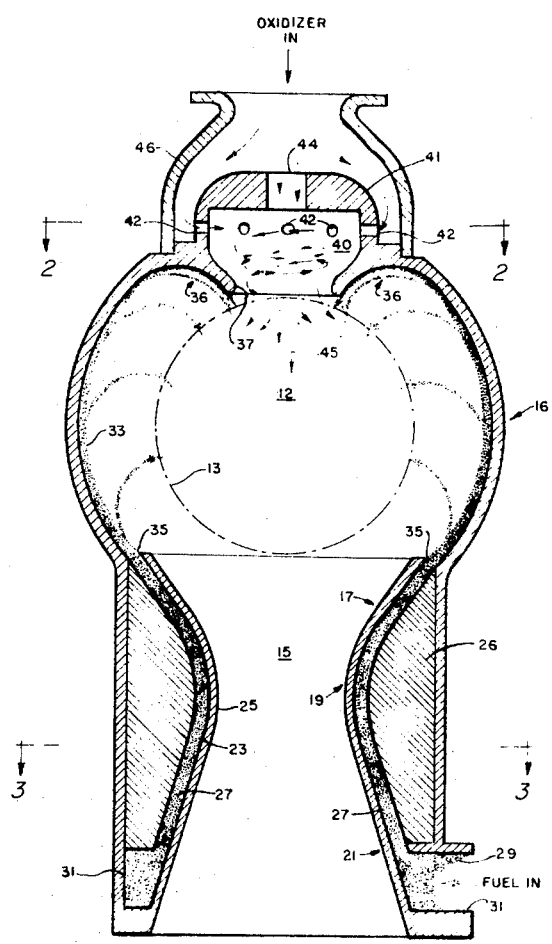

INVENTOR.
MARTIN G. DREXHAGE

REVERSE FLOW INTERNALLY-COOLED ROCKET ENGINE

BACKGROUND AND SUMMARY OF THE INVENTION

The invention relates generally to rocket engines of the type which develop large gas volume thrust effects upon reactive engagement of fluids of the so-called fuel and oxidizer types; and wherein one of the fluids acts as a coolant for the walls of the nozzle and combustion chamber portions of the engine. The present invention provides specific design and construction improvements in such engines and contemplates a novel integration of methods of propellant injection and combustion and engine wall and nozzle cooling; thereby providing an efficient rocket thrust chamber which is simple to fabricate from non-exotic materials. The engine is characterized by low internal and external wall temperatures when operating, and therefore offers long service and cycle life. The geometry of the engine design inherently provides for overall compactness, and minimum volume and weight.

As rocket engine reactant technology has developed, high energy combinations of fuels, such as fluorine-hydrogen, oxygen-hydrogen have been employed as propellants. Although these and other extremely high energy gaseous and/or liquid propellant combinations develop the desired increased quantities of heat and power, various parts of the rocket engine (especially the throat of the nozzle) become increasingly vulnerable to damage by the high temperatures of the exiting combustion gases. Accordingly, much work has been done in attempts to develop thermally stable rocket engine parts, and various exotic materials and high temperature alloys have been employed. In addition to using such special materials of construction, reverse flow cooling techniques have been employed for cooling parts of a rocket engine with the incoming cool gases, and vortex or swirl fluid injectors have been employed to feed the gaseous reactants to the rocket combustion chambers. Examples are shown in U.S. Pat. No. 3,451,223; 3,462,956 and 3,169,368. However, prior to the present invention such techniques had not been combined in such manner as to produce a satisfactorily operable film-cooled rocket engine.

The difficulties encountered with prior art attempts to cool rocket engine thrust mechanisms have been overcome by the present invention which combines: film cooling of the nozzle by passage of all of one of the reactants, such as hydrogen, along the positively curved interior wall of the combustion chamber; then reversing the direction of flow thereof by means of a toroidal shaped guide structure at the far end of the combustion chamber; and finally blending the aforesaid reactant gas with another reactant, such as an oxidizer, e.g., oxygen. The mixture is then whirled into the combustion chamber in such manner as to ensure optimum reaction and development of thrust producing gases. Such a combination of effects produces the unitary and exceptionally desirable result of the present invention, whereby high efficiency of combustion and thrust gas blast development is attained, while the wall temperatures of the engine are held so low as to produce no adverse heating effects on the environmental hardware. Thus, the invention allows the use of ordinary heat-resistant materials for the rocket engine construction and requires no use of exotic alloys or other exhorbitantly expensive special materials.

DETAILED DESCRIPTION OF THE INVENTION

Figure 1:
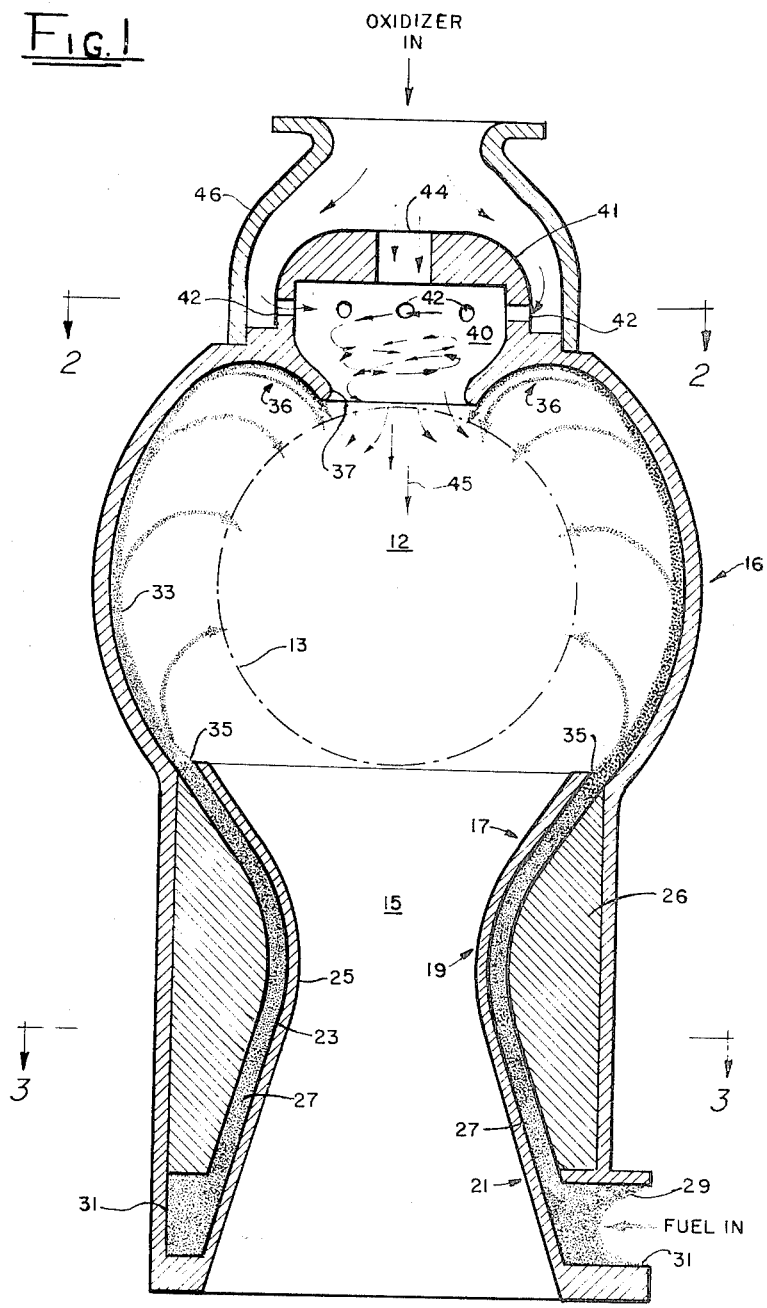

By way of example, a rocket engine of the present invention is illustrated by the accompanying drawing, wherein:

THE DRAWING

Figure 2:
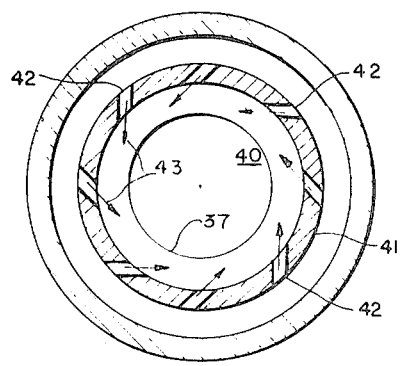
Figure 3:
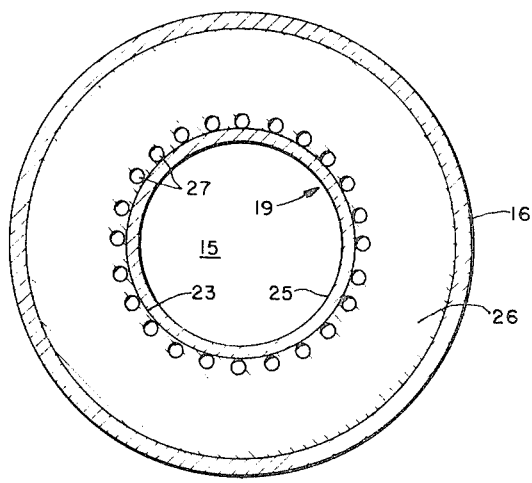

FIG. 1 is a central longitudinal sectional view of a self-cooling rocket engine of the present invention, illustrating the paths of travel of the reactant gases and cooling of the nozzle section and the combustion chamber wall; and FIGS. 2 and 3 are sections taken as suggested by lines 2—2 and 3—3, respectively, on FIG. 1.

As shown by the drawing herewith, a self-cooling rocket engine of the invention may be constructed to comprise generally a combustion chamber section 12 and a nozzle section 15. These components may conveniently be formed by and enclosed within a unitary shell, as illustrated at 16. The nozzle section includes a convergent portion 17; a throat portion 19; and a divergent portion 21. Inner wall portion of the nozzle section structure is provided with a plurality of passageways 27 closely adjacent the inner wall surface thereof, for passage therethrough of one of the reactant gases which is fed to the passageways 27 by means of an intake manifold as illustrated at 29. Such gas, which may be the fuel gas, but may alternatively be the oxidizer, will be led to enter passageways 27 at the lower ends thereof adjacent the thrust exit end of the nozzle section by means of a manifold 31 encircling the exit end of the nozzle.

The passageways 27 may with facility be formed within the nozzle wall structure by the method taught in U.S. Pat. No. 2,935,841. Or, if preferred, the cooling passage system may be of any other form, fabricated by any other method such as "electro-beam" milling. For example, as illustrated in the drawing herewith, a filler sleeve as shown at 26 may be cast in place and drilled as explained hereinabove; or separately machined and inserted between the shell 16 and the throat liner 25, having been previously channeled as by mechanical milling or electro-beam milling, to provide the fuel passageways 27. Thus, the filler member 26 provides mechanical support and structural integrity to the throat section of the engine. In any case, the coolant is arranged to exit as indicated at 35 and to spread out into the combustion chamber section in a film pattern tangential to the curved form thereof. Thus, the film of coolant hugs the positive curved form of the combustion chamber wall surface as it flows thereagainst until it reaches the upper end of the chamber and cascades inwardly and downwardly as illustrated at 36 against the toroidal shaped wall structure of the inlet end portion of the chamber. This toroidal shaped structure is of a smaller radius of sectional curvature than the body of the combustion chamber wall which is substantially spherical in form, and encompasses the exit orifice 37 of an injection chamber portion 40 of the shell structure through which the other fluid reactant is introduced.

The injection chamber device 40 comprises a hood-shaped structure 41 surmounting the exit orifice 37 and having a plurality of inlet openings 42 through the cylindrical side wall thereof, which are directed therethrough obliquely towards the center thereof as illustrated by directional arrows 43 (FIG. 2), whereby when gaseous fluid passes therethrough under pressure it assumes a swirling motion as illustrated by the swirling directional arrows of FIG. 1. The hood 41 is also formed with a straight-through central aperture 44 through which a predetermined fraction of the fluid feed passes directly as shown by directional arrows 45 into the combustion chamber from the fluid inlet manifold 46 which encompasses the hood 41. Thus, the fraction of fluid feed which passes directly through the aperture 44 encounters the other fraction of the fluid feed which enters the chamber 40 with a swirling motion, in such manner as to drive through the "eye" or low pressure center region of the vortex within the chamber 40, and into the combustion chamber 12. The combustion process is thereby maintained within the prescribed combustion zone 13. This prevents the combustion process from extending into the injection chamber such as would otherwise overheat and destroy its structural integrity. As the reactant passes through the throat 37 it thereupon centrifugally expands in flow pattern and admixes intimately with the cascading shower of the other reactive fluid so as to produce an optimum evolution of product gas volume which blasts out through the engine nozzle.

Thus, it will be appreciated that after the reactant gas 29 passes through the passageways 27 and cools the nozzle wall 25 it enters the combustion chamber 12 through the outlets 35 of the conduits 27 which are so directed as to give the somewhat pre-heated but still cooling reactant 29 an outwardly film-forming directional motion, maintaining it in hugging contact with the inner wall of the combustion chamber. Thus, the reactant 29 travels against the curved side wall portion of the combustion chamber and insulates it from the intense temperatures which develop in the combustion zone of the chamber. It is also to be understood that the combustion chamber need not be strictly spherical in shape, but it should be positively curved (convex) and should communicate at the top thereof with a toroidal or other curved wall section which changes the direction of fuel travel as explained hereinabove.

As is illustrated herein, the fuel and oxidizer fluids mix together in the combustion chamber with a vortex type motion, whereby portions of the mixtures are spun off the whirl pattern while the coolant fluid cascades inwardly towards the center of the whirling mass. This combustion of whirling and longitudinally directed driving action maintains the stability of the reactant mixture and the components thereof in the combustion chamber, while promoting travel of the coolant fuel along the combustion chamber wall as explained hereinabove. Typically, the proportion of oxidizer delivered longitudinally through the port 44 into the vortex chamber will be from one-fifth to five times that injected through the peripheral or whirl ports 42.

I claim:

1. A self-cooling rocket engine for mixing and burning fuel and oxidizer components of a propellant system, comprising in combination, a combustion chamber section and a nozzle section having a convergent portion in open communication with one end of said combustion chamber and a throat portion and a divergent exit portion, said combustion chamber having, at the opposite end thereof, a toroidal shaped inlet end portion protruding into the combustion chamber and having an orifice aligned with the throat portion of said nozzle section, said combustion chamber having an inner wall surface which, in longitudinal section, diverges from said nozzle section and in continuously concave fashion extends to a region beyond said inlet end portion where it reverses direction to extend inwardly and toward said throat in surrounding relation to said orifice;

fluid injection means for supplying one component of said propellant system to the combustion chamber through said orifice, including means for imparting to a portion of said one component a swirling motion as it enters the combustion chamber through said orifice, said nozzle section having fluid passageway means through the wall structure thereof surrounding the exit, throat and convergent portions thereof, means for supplying the other component of said propellant system to said passageway means, said passageway means including outlet means for discharging said other component therefrom toward the opposite end of said combustion chamber in tangential relation to said inner wall surface of the combustion chamber to form a film adhering closely along and against said inner wall surface of the combustion chamber until brought into contact with said first component as it enters said chamber through said orifice.

2. A method of cooling the interior walls of a rocket engine having a combustion chamber zone and a nozzle while mixing and burning therein fuel and oxidizer components of a propellant system which comprises passing one component of the propellant system in heat exchange contact with the inner wall surface of the engine nozzle and thence into one end of the combustion chamber zone countercurrent to combustion gas flow and against the inside wall of said combustion chamber zone while swirling the other component into the other end of the combustion zone concurrent with combustion gas flow, and then changing the direction of said one component near the other end of said combustion chamber zone and directing it thereat in surrounding relation into said other component, thereby reacting the two components substantially in the central part of said combustion zone and out of direct contact with the walls thereof, and finally discharging the combustion gas products of reaction from said zone through the cooled nozzle.

3. A method according to claim 2 wherein said one component is a fuel, and wherein the other component is an oxidizer.

4. A method according to claim 2 wherein a portion of said other component is introduced in swirling fashion and including the step of introducing another portion of said other component into said combustion zone centrally through the swirling portion.

5. A self-cooling rocket engine as defined in claim 1 including means for introducing another portion of said one component centrally through said orifice in axial direction toward said throat portion.

6. A self-cooling rocket engine having a combustion chamber section for mixing and burning fuel and oxidizer components of a propellant system, said rocket engine including a nozzle section at one end of said combustion chamber section having a constricted throat and a divergent exit portion for expanding combustion gas products issuing through said throat to develop thrust in a selected direction, means for introducing one of said components into the other end of said combustion chamber section in the form of a vortex having a net axial flow aligned with and directed toward said throat, means for cooling said nozzle section with the other component, said combustion chamber section including inner wall surface means for receiving a surface layer of said other component at the juncture between said combustion chamber and nozzle sections and for directing it as a surface layer to the said other end of the combustion chamber section countercurrent to combustion gas flow and then reversing its direction to flow in enveloping relation into said vortex, and means for directing said other component to flow as said countercurrent surface layer after cooling said nozzle section.

7. A self-cooling rocket engine as defined in claim 6 wherein said means for introducing said one component includes means for forming said vortex from one portion of said one component and means for introducing another portion of said one component centrally through said vortex.

8. A self-cooling rocket engine according to claim 7 wherein that portion of said one component which is introduced centrally through said vortex is from one-fifth to five times that which is introduced as said vortex.

* * * * *